Feb. 11, 1930.  G. B. KEPLINGER  1,746,261
AUTOMATIC RESERVOIR DOUBLE BOILER
Filed Jan. 20, 1928
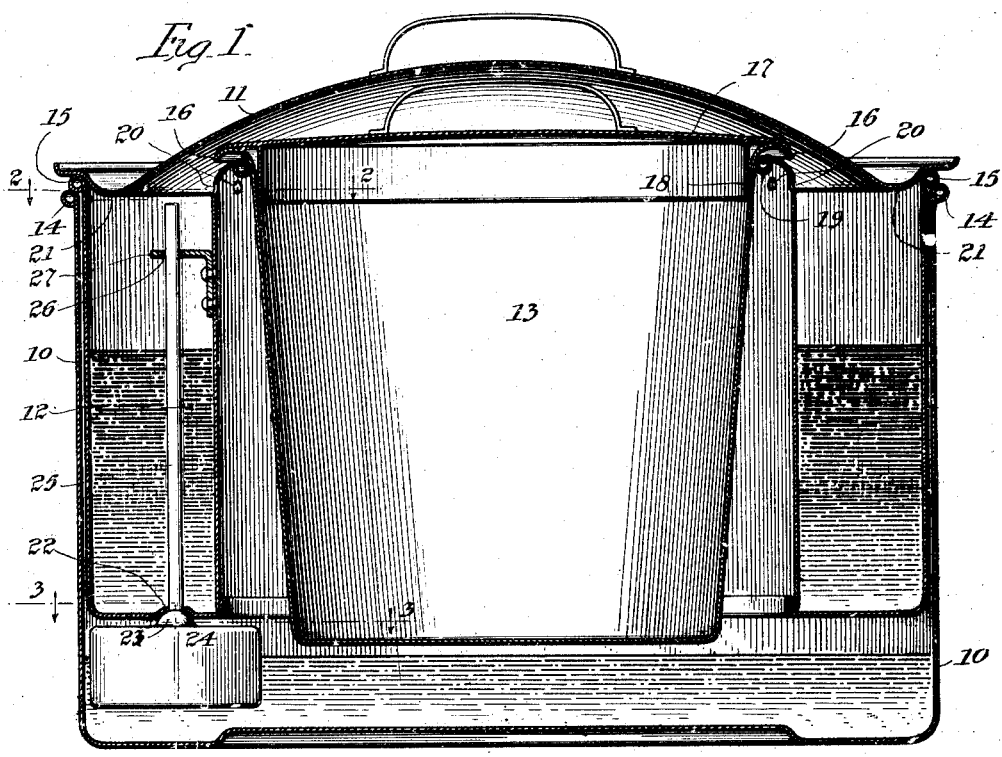
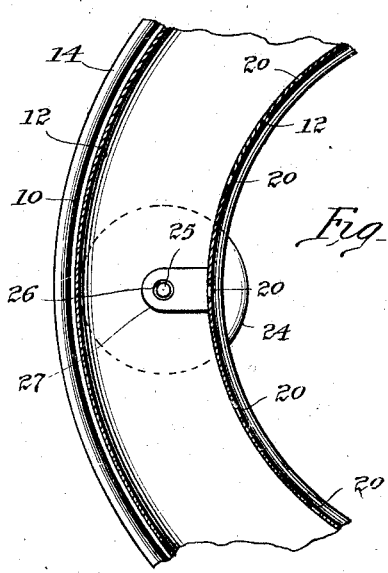
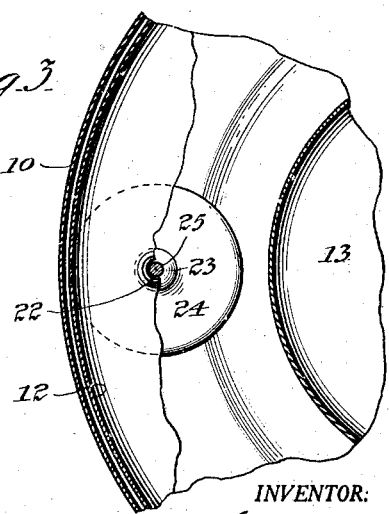
INVENTOR:
George B. Keplinger
BY John Howard McElroy
his ATTORNEY.

Patented Feb. 11, 1930

1,746,261

UNITED STATES PATENT OFFICE

GEORGE B. KEPLINGER, OF CHICAGO, ILLINOIS, ASSIGNOR TO JOHN HOWARD McELROY, OF CHICAGO, ILLINOIS

AUTOMATIC RESERVOIR DOUBLE BOILER

Application filed January 20, 1928. Serial No. 248,164.

My invention is concerned with what is known as double boilers, in which a cereal or other food is cooked by having its containing vessel surrounded by or partly immersed in boiling water so that the temperature of the food being cooked cannot rise above the boiling point and thus be burned. As these devices have been ordinarily heretofore constructed, unless a very large amount of water was used, there was always the possibility of the water being completely boiled away, with the result that the water-containing vessel might have its bottom burned through before the fact was discovered. My invention is designed to prevent this possibility, as well as to render it more efficient in that the steam arising therefrom entirely surrounds the food-containing vessel, and as it is condensed eventually is allowed to flow back into the boiling water, thus conserving it.

To illustrate my invention, I annex hereto a sheet of drawings, in which the same reference characters are used to designate identical parts in all the figures, of which,—

Fig. 1 is a central vertical section through a boiler embodying my invention; and Figs. 2 and 3 are details in section on the lines 2—2 and 3—3, respectively, of Fig. 1.

In carrying out my invention in its preferred form, I contemplate employing for the main reservoir 10 any standard type of such reservoir for ordinary double boilers, although, for ordinary sizes of the cooking receptacle, a larger reservoir will be required. Co-operating with this main reservoir 10, I provide a closely fitting lid 11, which, however, will not prevent the escape of some steam in case the pressure becomes high enough. As shown, the top thereof is arched in a considerable concave for the purpose to be hereinafter described.

Inside of this main reservoir 10, I place an auxiliary reservoir 12, which is preferably annular in its outline, and reaches down to a point some distance above the bottom of the main reservoir, but preferably a short distance above the bottom of the food receptacle 13 which is placed therein. The main and auxiliary receptacles 10 and 12 are preferably provided with the rims 14 and 15, the rim 15 resting on the rim 14 and in turn supporting the outer edge or rim of the cover 11. The cooking receptacle 13 is provided with the rim 16, and a cover 17 for the cooking receptacle is preferably provided, and has the inwardly projecting rim 18 co-operating with the interior of the cooking receptacle but permitting the necessary escape therefrom of the vapor arising from evaporation of the contents. The inner rim 19 of the auxiliary reservoir preferably extends to some distance above the outer rim thereof, and serves to support the cooking receptacle 13, whose rim 16 comes down on the same and is wide enough to permit of some automatic adjustment between the parts. Below the rim 19, I place in the auxiliary reservoir a series of apertures 20, which are not numerous enough to weaken the vessel, but are sufficient to permit the steam arising from the boiling water in the main reservoir to pass through the same and strike the concave interior of the lid 11, upon which a very considerable portion of the steam will be condensed, and will flow down the inner surface of the lid to the lowest point 21 thereof, where it will drop into the auxiliary reservoir 12. If any of the condensed steam from the main reservoir drops on the lid 17, that is likewise curved sufficiently so that the water will flow off of it and drop down into the auxiliary reservoir, so that all the steam that condenses in the vessel will flow into the auxiliary reservoir.

To regulate the return of the water from the auxiliary reservoir to the main reservoir, and thus keep the water in the main reservoir at the proper depth for efficient boiling with a comparatively small flame, I employ the following mechanism:—In the bottom of the auxiliary reservoir 12, I form an aperture 22, which is surrounded by a slightly concaved portion so that it forms what is virtually a valve seat. Co-operating with this valve seat is a correspondingly shaped valve 23, which is centrally located on the top of a float 24, which might be constructed of wood, but which is preferably hollow and constructed of metal. The float and valve are provided with what might be called a valve stem 25 protruding upward from the center thereof and passing loosely at its upper end through an aperture 26 formed in a bracket 27 secured to the inner face of the inner wall of the auxiliary reservoir 12 near its top.

The operation of the apparatus thus described is as follows:—The main reservoir 10 is filled with water to the desired depth which is efficient for boiling, which may be to the bottom of the auxiliary reservoir, and the auxiliary reservoir is preferably also partially filled with water, after which the food receptacle with its lid is inserted and the lid 11 put in place, and the boiling started. The steam arising from the boiling water will, of course, surround the cooking receptacle 13 and secure the desired heat therein, after which it passes through the apertures 20 and in contact with the under surface of the lid 11, where a very considerable portion thereof condenses and is discharged into the auxiliary reservoir in the manner previously described. When the water supply in the main reservoir is reduced below the desired amount, the float 24, supported thereby, drops enough to open the valve 23 and allow the water from the auxiliary reservoir gradually to enter the main reservoir, and in this manner the proper amount of water for the most efficient boiling and cooking is always in the bottom of the main reservoir, and the apparatus can function most efficiently. As a very considerable percentage of the steam is condensed and the water used over and over, it is obvious, especially with a liberal supply of water in the auxiliary reservoir, that there is very little chance of its being accidentally allowed to boil dry and burn out the bottom of the main reservoir.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a double boiler, the combination with a water-boiling main reservoir having a cover on the interior of which the steam is condensed, of an auxiliary reservoir therein having an apertured bracket near the top thereof and a discharge outlet in the bottom thereof beneath said apertured bracket and constituting a valve seat, a food receptacle therein, a valve co-operating with said seat, a float secured to said valve and moved by the fall of the water in the main reservoir, and a guiding stem secured to said valve and extending up through the valve seat and the aperture in the bracket in the reservoir.

2. In a double boiler, the combination with a water-boiling main reservoir having a cover on the interior of which the steam is condensed, of an annular auxiliary reservoir therein having an apertured bracket secured on the interior thereof near the top and having a discharge outlet in the bottom thereof constituting a valve seat located directly beneath said apertured bracket, a food receptacle adapted to fit in the auxiliary reservoir, a valve co-operating with said seat, a float in the main reservoir secured to said valve and moved by the fall of the water in said main reservoir, and a guiding stem secured to the valve and extending up through the valve seat and the apertured bracket, substantially as and for the purpose described.

3. In a double boiler, the combination with a water-boiling main reservoir, of an auxiliary reservoir therein having an apertured bracket near the top thereof and a discharge outlet in the bottom thereof beneath said apertured bracket and constituting the valve seat, a food receptacle therein, a valve co-operating with said seat, a float secured to said valve and moved by the fall of the water in the main reservoir, and a guiding stem secured to said valve and extending up through the valve seat and the aperture in the bracket in the reservoir.

4. In a double boiler, the combination with a water-boiling main reservoir, of an annular auxiliary reservoir therein having an apertured bracket secured on the interior thereof near the top and having a discharge outlet in the bottom thereof constituting a valve seat located directly beneath said apertured bracket, a food receptacle adapted to fit in the auxiliary reservoir, a valve co-operating with said seat, a float in the main reservoir secured to said valve and moved by the fall of the water in the main reservoir, and a guiding stem secured to the valve and extending up through the valve seat and the apertured bracket, substantially as and for the purpose described.

5. In a double boiler, the combination with a water-boiling main reservoir having a cover on the interior of which the steam is condensed, of an auxiliary reservoir associated therewith containing a supply of extra water and into which the condensed steam is discharged, a food receptacle therein, and means operating automatically by the action of the water in the main reservoir to cause some of the water in the auxiliary reservoir to discharge into the main reservoir only when the water in the latter falls below a certain level and then only until the normal level is restored.

6. In a double boiler, the combination with a water-boiling main reservoir having a cover on the interior of which the steam is condensed, of an auxiliary reservoir associated therewith containing a supply of extra water and into which the condensed steam is discharged, a food receptacle therein entirely surroundable by the steam, and means operating automatically by the action of the water in the main reservoir to cause some of the water in the auxiliary reservoir to discharge into the main reservoir when the water in the latter falls below a certain level and then only until the normal level is restored.

7. In a double boiler, the combination with a water-boiling main reservoir having a cover on the interior of which the steam is condensed, of an auxiliary reservoir therein containing a supply of extra water and having a discharge outlet in the bottom thereof with its under side constituting a valve seat, a food receptacle therein, a valve co-operating with said seat, and a float secured directly to said valve and allowed to drop by the fall of the water in the main reservoir to open the valve until the desired level of water in the main reservoir is restored, when the valve closes the discharge outlet.

In witness whereof, I have hereunto set my hand this 14th day of January, 1928.

GEO. B. KEPLINGER.